May 26, 1970 R. H. SMITH 3,513,878
POWER TRANSMISSION
Filed Nov. 17, 1967
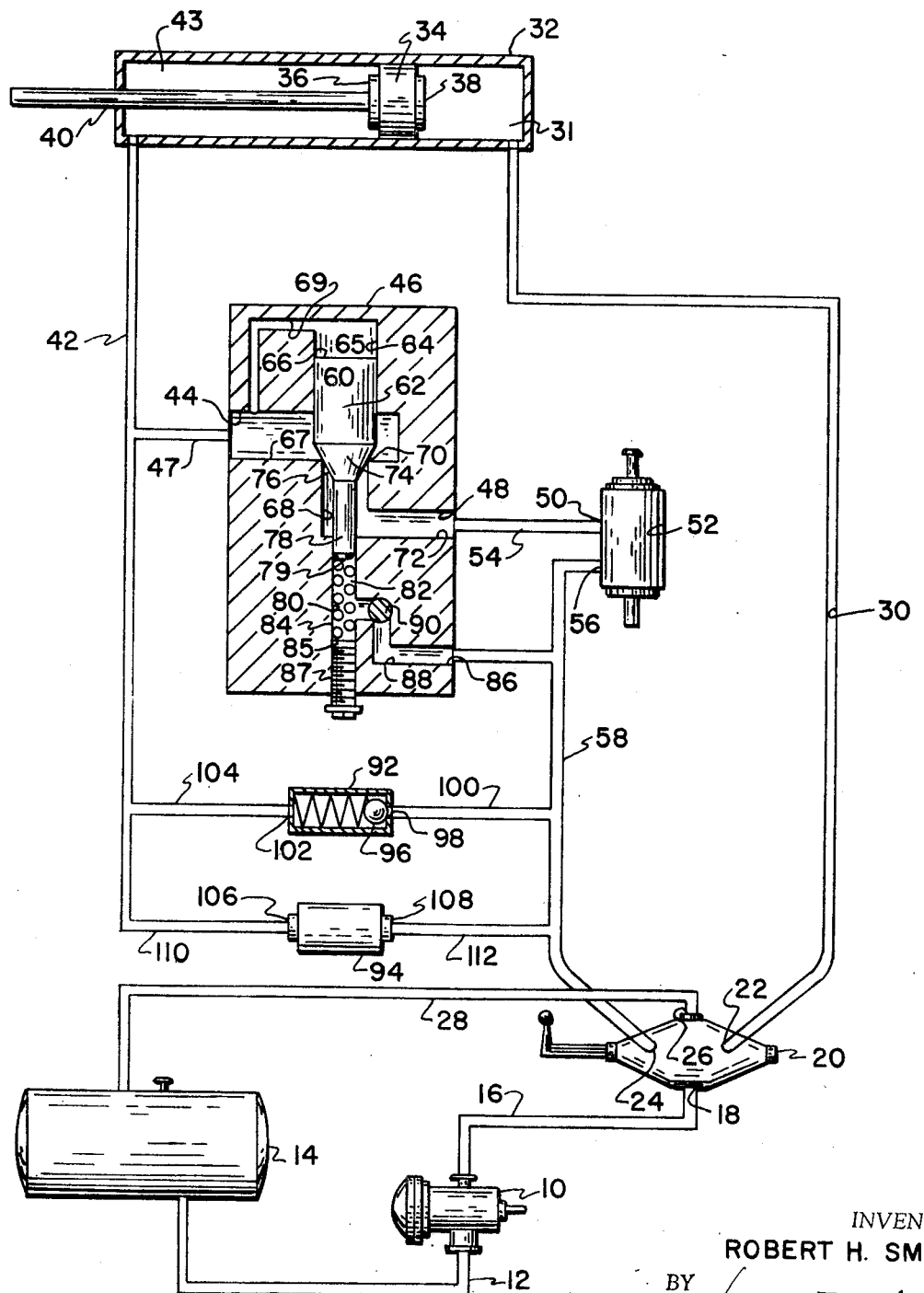
INVENTOR.
ROBERT H. SMITH
BY
*Van Meter & George*
ATTORNEYS United States Patent Office 3,513,878
Patented May 26, 1970

3,513,878
POWER TRANSMISSION
Robert H. Smith, Warren, Mich., assignor to Sperry Rand
Corporation, Troy, Mich., a corporation of Delaware
Filed Nov. 17, 1967, Ser. No. 683,998
Int. Cl. F16k 17/30; F15b 15/22
U.S. Cl. 137—613                                    3 Claims

ABSTRACT OF THE DISCLOSURE

A hydraulic power transmission system having in combination a deceleration valve, a flow control valve, and a zero leakage valve, wherein the zero leakage valve will prevent fluid leakage through the deceleration valve when the same is completely closed, thus enabling accurate flow control through the flow control valve at very low volumetric ranges.

BACKGROUND OF THE INVENTION

This invention relates to power transmissions, and is particularly applicable to those of the type comprising two or more fluid pressure energy translating devices, one of which may function as a pump and another as a fluid motor.

The invention is generally concerned with flow control valves, and is more particularly concerned with throttle valves which have a wide use in hydraulic machine tool drives, such as for decelerating a fluid motor near the end of its stroke or prior to the beginning of a feed movement. Because of this wide use in machine tool drives for the purposes stated, such throttling devices have been well-known as deceleration valves.

Valves of this type are generally placed in a motor return conduit and may be cam actuated for the purpose of variably restricting and cutting off flow from an inlet to an outlet port of the valve. When the valve has been actuated to a throttling position sufficient to increase pressure ahead of the valve to the setting of a relief or bypass valve in the system, the bypass valve is actuated to bypass pump displacement ahead of the motor, in increasing amounts as the deceleration valve is continued to be actuated for decelerating the motor. The deceleration valve may be shifted to a position completely stopping the motor. When such a valve is used for deceleration purposes in a feed circuit, a separate flow control valve may be utilized for accurately controlling the feed movement of the motor. The combination of a deceleration valve and a flow control valve in a feed circuit are common and well-known in the art.

In systems incorporating such a combination in which the deceleration valve is in a completely closed position and the feed movement is to be entirely controlled by the amount of flow metering through the flow control valve, there has been a problem in the past in accurately controlling this feed movement at extremely low volumetric ranges. This is due to the leakage in the deceleration valve. The amount of leakage in commercial deceleration valves varies with the size of the diameter of the valve spool. For example, a typical valve utilizing a two inch diameter valve spool will have a leakage rate of approximately 117 cubic inches per minute, at normal operating pressure. Thus, in a machine tool application which is adaptable for wide ranges of feed rates, there may be encountered a mode of operation requiring an extremely slow feed rate, such as in the cutting of titanium, where the rate of flow across the flow control valve may be as low as 5 to 10 cubic inches per minute. It is obvious that accurate control is impossible at this low volumetric range when the leakage across the deceleration valve is of such a relatively large magnitude.

Although deceleration valves may be adapted to control leakage within a very narrow range, when in a completely closed position, they require special handling under present manufacturing methods and thus are extremely expensive. It is also apparent that saving and economies in manufacturing, stock piling, and distribution would be lost if several valves, rather than one deceleration valve were provided for the wide range of volumetric ranges required by various system applications.

SUMMARY OF THE INVENTION

This invention comprises a zero leakage valve having a valve member with opposed operating surfaces thereon and responsive to pressure ahead of and beyond the valve for use in combination with a deceleration valve in a hydraulic feed circuit, wherein said valve member is adapted to prevent flow to the deceleration valve when the deceleration valve is completely closed.

It is therefore an object of this invention to provide in a hydraulic feed circuit a combination of a deceleration valve and a zero leakage valve which will prevent leakage across the deceleration valve when the deceleration valve is completely closed.

It is also an object of this invention to provide in a hydraulic feed circuit having in combination a deceleration valve and a flow control valve, a zero leakage valve which will prevent leakage across the deceleration valve when the deceleration valve is completely closed, thus enabling accurate control of the feed at very low volumetric ranges.

It is also an object of this invention to provide an improved zero leakage valve.

It is still another object of this invention to provide an improved zero leakage valve in which its rate of closure may be regulated.

It is a further object of this invention to provide a zero leakage valve and feed circuit which is compact and economical to manufacture, which is designed to meet a wide range of volumetric requirements, and which is efficient in operation over a long life.

Further objects and advantages of the present invention will be apparent from the following description, reference being had to the accompanying drawing wherein a preferred form of the present invention is clearly shown.

In the drawing

The single figure is a diagrammatic view of a power transmission system incorporating a preferred form of the present invention.

Referring now to the drawing, a hydraulic power transmission includes a pressure fluid source comprising a variable displacement pump 10 adapted to be driven by a suitable prime mover, such as an electric motor, not shown. The pump 10 has a suction conduit 12 for withdrawing fluid from a tank or reservoir 14 and a delivery conduit 16.

Delivery conduit 16 is connected to the pressure port 18 of a suitable four-way directional valve 20 which also has cylinder ports 22 and 24 and a tank port 26. A conduit 28 connects the tank ports 26 of the directional valve 20 to the reservoir 14. A conduit 30 connects port 22 of the valve 20 to the head end 31 of a reciprocable fluid motor 32 containing a fluid operated piston 34 having opposed pressure operating surfaces 36 and 38. The piston 34 is connected to a piston rod 40. A conduit 42 connects the rod end 43 of motor 32 to an inlet port 44 of a zero leakage valve 46 through conduit 47. An outlet port 48 of the valve 46 is connected in series to an inlet port 50 of a flow rate controlling valve or deceleration valve 52 by means of conduit 54. Valve 52 may be of the well-known type disclosed in the patent to G. F. Elston, et al. No. 3,037,527. Deceleration valve 52 has an outlet port 56 which is connected to the control port 24 by means of conduit 58.

Zero leakage valve 46 contains a valve member 60 having a cylindrical end section 62 slidable mounted in a bore 64 and which forms a pressure chamber 65 in which operating end surface 66 of the valve member is responsive to changes in pressure therein. The inlet port 44 communicates with a passage 67 extending into the valve and which intersects a bore 68 which is in axial alignment with, and of smaller diameter than, the bore 64. The chamber 65 is connected to the passage 67 by means of passage 69. A valve seat 70 is formed on the end of bore 68. Bore 68 is connected to the outlet port 48 by means of passage 72, thus, the inlet port 44 is connected to the outlet port 48 by means of passages 67 and 72 and bore 68. The valve member 60 has a center section 74 of a conical frustrum shape having an operating surface 76 formed thereon in opposing relation to end surface 66 and is responsive to changes in pressure acting thereon. The conical end section 74 is adapted to engage the valve seat 70, thus closing communication between the inlet 44 and the outlet 48. The effective area of the conical end surface is less than the effective area of end surface 66. Valve member 60 has a piston member 78 of generally cylindrical shape extending from the conical section 74 through bore 68 and is slidably mounted in a smaller bore 80 forming an expansible pressure chamber 82 therein. The piston member 78 has an end surface 79 which forms a shiftable wall member in chamber 82 and is responsive to the pressure acting thereon, and is in opposing relation to the opposite valve member end surface 66. The valve member 60 is biased into an opened position by spring 84 which is disposed in the chamber 82 between the piston end surface 79 and a movable abutment 85. The movable abutment is adjusted by screw 87 to vary the compression of spring 84 and the force with which that spring urges the piston 78 upwardly in chamber 80. The pressure chamber 82 is connected to a pressure sensing inlet port 86 by means of a pressure sensing passage 88. The pressure sensing inlet port 86 connects the sensing passage 88 to the conduit 58 downstream, or to a point beyond the outlet port 56 of the deceleration valve 52. An adjustable throttle 90 is formed in the pressure sensing passage 88 for controlling the rate of flow therethrough.

Connected in parallel with the zero leakage valve and the deceleration valve are a check valve 92 and a throttle or flow control valve 94. The check valve 92 has a biased ball 96 seated against an inlet 98 and is connected to the conduit 58 by means of conduit 100. A check valve outlet 102 is connected to conduit 42 by means of a conduit 104 and the valve 92 is adapted to allow the passage of flow from conduit 58 to 42 but not vice versa. The flow control valve 94 may be of the well-known type disclosed in the patent to G. F. Elston et al., No. 3,082,787 and has an inlet port 106 and an outlet port 108 which are respectively connected to the conduits 42 and 58 by means of conduits 110 and 112, respectively.

In operation, the directional control valve 20 may be manually operated to direct pressure fluid from pump 10 to conduit 58 and to the rod end of motor 32 by means of check valve 92 and also through the deceleration valve 52 and zero leakage valve 46 and conduit 42. The pressure fluid in the rod end of motor 58 acts against the surface 36 thus moving piston 34 and rod 40 in a rightwardly direction. The fluid in the head end of motor 32 is acted on by the surface 38 of the piston 34, thus forcing fluid therein back to reservoir 14 by means of conduit 30, directional valve 20, and conduit 28.

To shift the rod 40 in a leftwardly direction, the directional control valve 20 is reversed, thus directing pressure fluid from pump 10 to conduit 30 and to the head end of the motor 32 where the pressure fluid acts on the surface 38 to move the piston and rod. The fluid in the rod end is acted on by surface 36 and is forced into the conduit 42 and in this mode of operation, the rod end 43 of the motor 32 may be considered as a source of pressure fluid.

Fluid will flow from the rod end of motor 32 through conduit 42, zero leakage valve 46, deceleration valve 52 and directional valve 20 to the reservoir 14 when the deceleration valve remains opened. The deceleration valve may be actuated manually or by means of a cam system, not shown, connected to the rod 40, thus closing after a predetermined movement of the rod 40 to initiate a feed mode of operation.

Since the effective area of end surface 66 is greater than the effective area of the conical surface 76, and the pressure in chamber 65 and bore 68 are essentially equal, the resultant force acting on the valve member 60 will tend to shift the valve member downwardly towards engagement with the valve seat 70. The downward movement of the valve is opposed by the spring 84 and the resultant force due to the pressure in chamber 82 acting on end surface 79 of the valve member 60. As herebefore mentioned, the purpose of the deceleration valve is to decelerate the movement of the rod 40 to some predetermined rate and this is accomplished by restricting the amount of flow through the deceleration valve which in turn results in a substantial pressure drop across the valve between conduits 54 and 58 from initial actuation to the final closure of the deceleration valve. Thus, there will be a pressure differential between the pressure chambers 65 and 80, and when this differential reaches a predetermined amount, the resultant downward force of the pressures on surfaces 66, 76, and 79 will exceed that of the spring force, seating valve member 60 against seat 70. The pressure drop created across the deceleration valve upon initial actuation of the deceleration valve is sufficient to cause valve member 60 to engage seat 70. If this were to occur, the movement of rod 40 would be decelerated substantially faster than is desirable and would defeat the purpose of the deceleration valve. To delay the closing of the zero leakage valve member 60 until after the closure of the deceleration valve, the throttle 90 was provided in the pressure sensing passageway 88. The pressure in the chamber 82 is controlled by the rate of fluid passing through throttle 90 and, thus, the pressure therein may be varied by adjusting the throttle 90. After the deceleration valve 52 has closed, the pressure in chamber 82 will continue to decrease and when the resultant force due to the pressures acting on surfaces 66, 76, and 79 exceeds that of the spring force, the valve member 60 will seat against seat 70, thus closing communication between the inlet 44 and the outlet 48.

After the deceleration valve has closed, the pressure in chamber 48 will drop to equal the pressure in conduit 58 due to the internal leakage across the deceleration valve 52, thus the pressure acting on end surface 66 will maintain the valve member seated until the flow in the system is reversed by means of directional valve 20 and the pressure in chamber 82 and bore 68 is raised to substantially the same pressure as is acting on end surface 66.

With the zero leakage valve closed, all flow leaving the rod end 43 of the motor 32 will pass into the flow control valve 94, thus enabling a more accurate control of the feed mode.

It will thus be seen that the present invention has provided in a hydraulic transmission system an adjustable zero leakage valve in combination with a deceleration valve which will prevent leakage across the deceleration valve when the same is completely closed, thus enabling accurate control during a wide range of volumetric requirements.

While the form of embodiment of the invention as herein disclosed constitutes a preferred form, it is to be understood that other forms might be adopted, all coming with the scope of the claims which follow.

What is claimed is as follows:
1. A hydraulic circuit comprising:
(a) a source of pressure fluid;
(b) a valve means for controlling the rate of flow of said fluid and adapted to substantially shut off said flow;
(c) a zero leakage valve connected in series with said valve and comprising:
   (1) a housing having an inlet connected to an outlet;
   (2) means connecting said inlet to said source of pressure fluid;
   (3) means connecting said outlet to said valve means, said outlet being upstream from said valve means;
   (4) a valve member having first and second opposed operating pressure surfaces, said first pressure operating surface having an effective area greater than said second pressure operating surface and said valve member being adapted to close communication between said inlet and said outlet in response to pressure acting on said first surface;
   (5) passage means connecting said first operating surface to said inlet;
   (6) means forming a pressure chamber having a shiftable wall member in opposing relation to said first operating pressure surface, said valve member normally opening communication between said inlet and said outlet in response to pressure acting on said shiftable wall member and said second pressure operating surface;
   (7) a pressure sensing passage connecting said chamber to a point downstream from said valve means; said valve member closing communication between said inlet and said outlet when said valve means substantially shuts off said flow; and,
   (8) means for resiliently biasing said valve member into said normally opened position.

2. A hydraulic circuit comprising:
(a) a source of pressure fluid;
(b) a valve means for controlling the rate of flow of said fluid and adapted to substantially shut off said flow;
(c) a zero leakage valve connected in series with said valve and comprising:
   (1) a housing having an inlet and an outlet;
   (2) a passageway having means forming a valve seat therein, said passageway connecting said inlet to said outlet;
   (3) a valve member having an end section of a generally cylindrical shape with an operating pressure surface at one end, said end section being slidably mounted in said housing;
      a center section of a generally conical frustrum shape having an operating pressure surface in opposing relation to said end surface; said conical section being adapted to engage said valve seat means to close communication between said inlet and said outlet in response to pressure acting on end surface;
      an opposite end section of a generally cylindrical shape of smaller cross section than said first end section extending from said center section, and having an operating pressure surface thereon in opposing relation with said first end surface, said opposite end section being slidably mounted in said housing; and,
      said valve member normally opening communication between said inlet and said outlet in response to pressure acting on said opposite end surface and said conical pressure surface;
   (4) means connecting said first end surface to said inlet;
   (5) a spring, said spring abutting said opposite end surface and biasing said valve member into an open position;
   (6) means connecting said inlet to said source of pressure fluid;
   (7) means connecting said outlet to said valve means, said outlet being upstream from said valve means; and,
   (8) a pressure sensing passage having a restriction therein, said passage connecting said opposite end surface to a point downstream from said valve means;
      said valve member closing communication between said inlet and said outlet when said valve means substantially shuts off closure relative to said valve means.

3. A zero leakage valve comprising:
(a) a housing having an inlet connected to an outlet;
(b) a valve member having first and second opposed operating pressure surface, said first pressure operating surface having an effective area greater than said second pressure operating surface and said valve member being adapted to close communication between said inlet and said outlet in response to pressure acting on said first surface;
(c) passage means connecting said first operating surface to said inlet;
(d) means forming a pressure chamber having a shiftable wall member in opposing relation to said first operating pressure surface, said valve member normally opening communication between said inlet and said outlet in response to pressure acting on said shiftable wall member and said second pressure operating surface;
(e) a pressure sensing inlet in said housing;
(f) a pressure sensing passage connecting said chamber to said inlet; and means for biasing said valve member into said normally open position.

References Cited
UNITED STATES PATENTS

| 2,255,787 | 9/1941 | Kendrick | 137—507 |
| 2,596,368 | 5/1952 | Brunton | 137—509 |

FOREIGN PATENTS

| 630,968 | 10/1949 | Great Britain. |

WILLIAM F. O'DEA, Primary Examiner

H. COHN, Assistant Examiner

U.S. Cl. X.R.

91—407, 447; 137—503, 509

UNITED STATES PATENT OFFICE
CERTIFICATE OF CORRECTION

Patent No. 3,513,878            May 26, 1970

Robert H. Smith

It is certified that error appears in the above identified patent and that said Letters Patent are hereby corrected as shown below:

Column 6, line 27, after "off" insert -- said flow, said restriction delaying said --; line 32, "surface" should read -- surfaces --.

Signed and sealed this 12th day of January 1971.

(SEAL)
Attest:

Edward M. Fletcher, Jr.            WILLIAM E. SCHUYLER, JR.
Attesting Officer                   Commissioner of Patents